March 17, 1942.  S. GEIGEL  2,276,720
CUTTER FOR SEED POTATOES
Filed Aug. 5, 1941

S. Geigel
INVENTOR.
BY A. Snow & Co.

Patented Mar. 17, 1942

2,276,720

UNITED STATES PATENT OFFICE 2,276,720

CUTTER FOR SEED POTATOES

Samuel Geigel, Carbondale, Colo.

Application August 5, 1941, Serial No. 405,559

1 Claim. (Cl. 146—170)

This invention relates to a device for use in cutting seed potatoes, one of the objects being to provide a simple and inexpensive structure on which one or two persons can work simultaneously to cut potatoes into sections, the cut portions, when released, gravitating to a suitable container provided therefor.

Another object is to speed up the cutting operation by the use of a two-edged knife whereby, when a held potato is moved with two motions, back and forth relative to the blade, it can be severed by two cuts into four parts, thereby reducing by at least one half, the number of motions heretofore necessary when cutting potatoes by hand.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figures 1, 2:
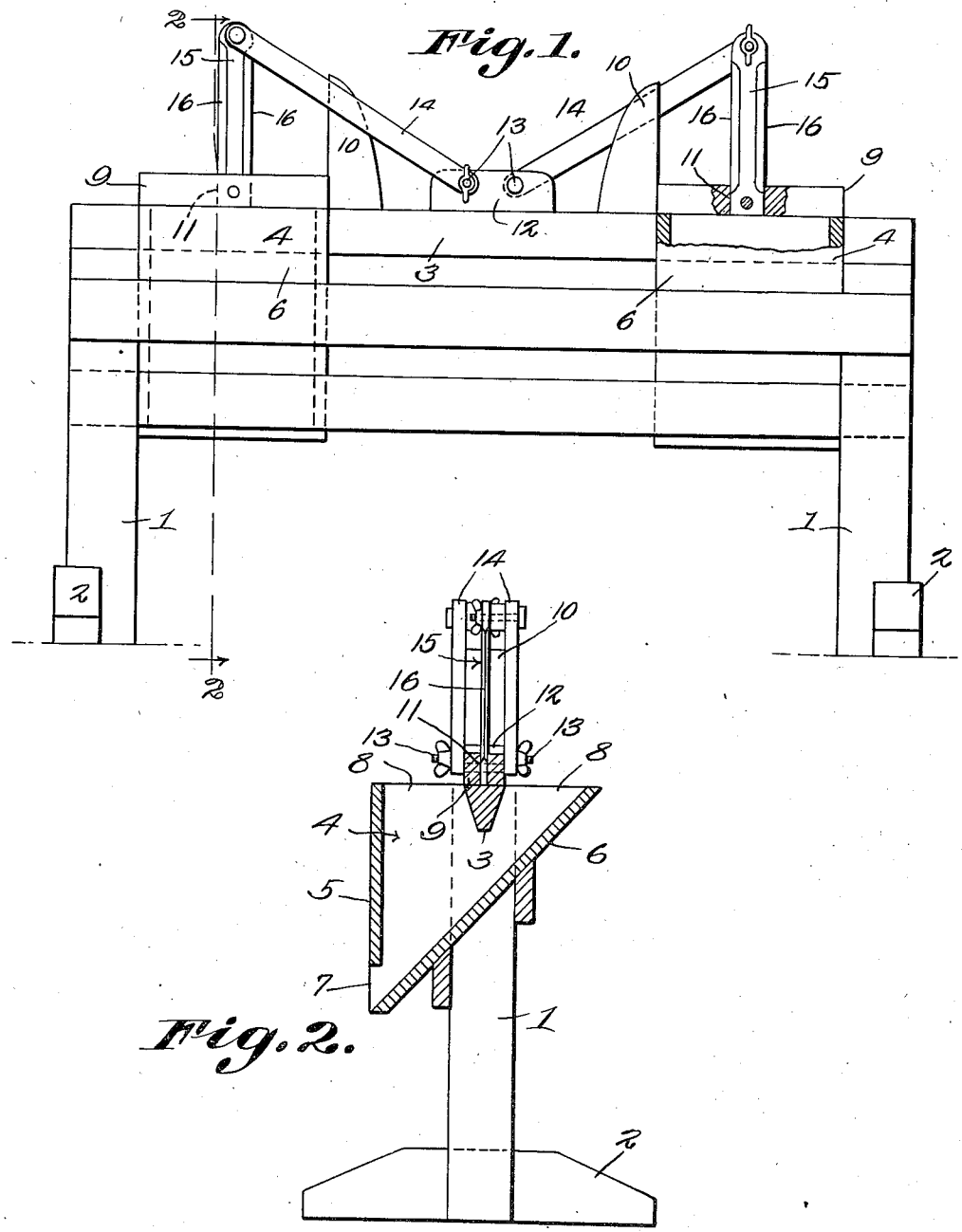
Figure 1 is a front elevation of the device.
Figure 2 is a section on line 2—2, Figure 1.

Referring to the figures by characters of reference, 1 designates standards held against lateral tilting by feet 2 or other suitable means. The upper ends of these standards are connected by a top bar 3 which extends across the top of two hoppers 4 one of which is located near each standard. Each hopper has a vertical wall 5 at one side while the other side 6 is inclined downwardly toward the lower end of wall 5 to define an outlet 7 at the bottom of the hopper. Each hopper is open beyond both sides of bar 3 to provide spaced inlets 8 and the outlets of both hoppers preferably are located at the same side of the device.

Mounted on bar 3 between the inlets 8 of each hopper is a block 9 having a stop 10 extending upwardly from one end, and a short groove or slot 11 is formed in the top of block 9 and extended longitudinally thereof.

A connecting block 12 is secured on the middle portion of beam 3 and has bolts 13 extended therethrough. On each bolt is mounted an arm 14 which extends past one of the stops. Wing nuts can be mounted on the bolts to hold the arms against movement following angular adjustment.

To the free end of each arm is detachably secured a flat elongated blade 15 the lower end of which is normally seated in one of the grooves or slots 11. Each blade has its opposed edges 16 sharpened and when the blades are seated in the grooves 11, they are spaced a sufficient distance from the respective stops to permit a potato to be inserted into or removed from said space.

In practice each blade is positioned and secured as shown. One operator is provided for each blade. A potato to be cut is placed on block 9 and pushed against and past knife 15 toward stop 10. This cuts it into two parts. It is then given a one-quarter turn between blade 15 and stop 10 and pulled back against and past the blade. This cuts each half into two parts. The parts can then be released and will fall through the inlets 8 into the hopper thereunder from which they can gravitate to a container provided therefor.

The entire structure except the blades and bolts, is formed preferably of wood and can be made at low cost.

By providing the arms 14 the blades can readily be lifted from grooves 11 and detached for cleaning and repairs, and the lower ends of the blades can be held firmly in the grooves.

What is claimed is:

A cutter for seed potatoes including a hopper having an outlet, a bar intersecting the top of the hopper, supporting means therefor, a block on the bar above the hopper, a potato-stop on the block, there being a groove in the block, an arm connected to the bar for up and down angular adjustment, a two-edged plate carried by the arm and seated at one end in the groove, and means for holding the arm and blade against movement relative to the block.

SAMUEL GEIGEL.